Nov. 11, 1958     J. K. NELSON     2,859,496
REFRIGERATION APPARATUS
Filed April 16, 1957
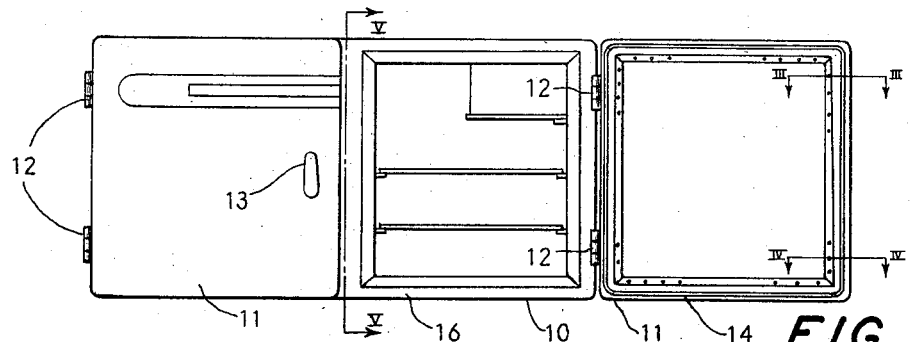
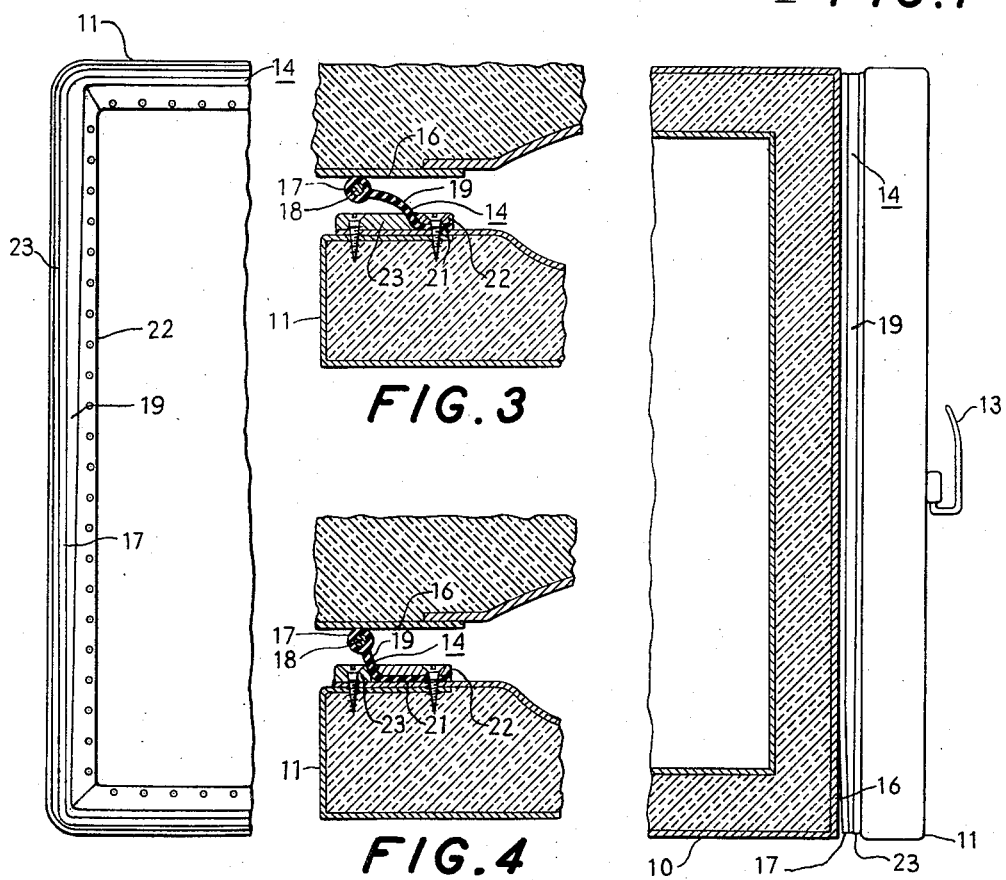
INVENTOR:
JAMES K. NELSON
BY
ATTORNEY

United States Patent Office 2,859,496
Patented Nov. 11, 1958

2,859,496

REFRIGERATION APPARATUS

James K. Nelson, Grove City, Ohio, assignor to Westinghouse Electric Corporation, East Pittsburgh, Pa., a corporation of Pennsylvania Application April 16, 1957, Serial No. 653,137

4 Claims. (Cl. 20—69)

This invention relates to refrigeration apparatus and more particularly to magnetic gaskets used for sealing refrigerator cabinets and the like. It is an object of this invention to provide improved apparatus of this kind.

Cabinets, such as refrigerators and the like, are usually provided with a gasket which extends around the access opening in order to seal the cabinet. Magnet structures have been utilized in a gasket structure to assist in effecting a better seal between the gasket and a magnetically attractable seat on the cabinet wall.

Doors equipped with magnetic gaskets are generally opened by an outward pull applied to a handle secured to the door. The initial pulling force required to overcome the magnetic forces is quite large when all contact surfaces of the gasket break contact with the seat simultaneously. This invention provides a gasket mounting arrangement which permits the gasket to separate or peel from the seat progressively with a relatively small initial pulling force on the handle. Of particular consequence in dealing with this problem is that portion of the gasket which is parallel to the axis of the door hinges and adjacent the handle edge of the door. The portions of the gasket disposed parallel to the hinge axis adjacent the hinged edge are easily separated by virtue of the large mechanical advantage afforded by the hingedly mounted door. Portions of the gasket disposed normal to the hinge axis are inherently separated progressively because the longitudinal axes of these portions move angularly with respect to their seating surface.

Therefore, it is a further object of this invention to enable a light pull on the door handle to break sealing contact between a magnetic gasket and its seat. A means for accomplishing this object is provided by a unique gasket mounting arrangement which, in the magnetic gasket segment parallel to the hinge axis and adjacent the handle edge of the door, exposes a longitudinally tapering, web-like gasket portion which connects the clamped gasket flange to the magnetic body portion of the gasket. When the door is opened, the magnetic body portion of the gasket remains attached to the seat until the slack in the web portion is taken up and the opening force operates to overcome magnetic forces. Since the exposed web portion of this gasket segment is tapered, the slack will be taken up first at the narrowest portion thereof, and a gradual separation or peeling of the gasket from the seat will result. Comparatively small forces are involved in opening the door since, instead of separating the entire gasket length from its seat at one time, small increments are separated successively in the peeling action.

The foregoing and other objects are effected by the invention as will be apparent from the following description and claims taken in connection with the accompanying drawings, forming a part of this application, in which:

Fig. 1 is a front elevational view of a domestic refrigerator cabinet with one of the doors thereof in open position;

Fig. 2 is an enlarged fragmentary view of the inner face of a door for the cabinet shown in Fig. 1, and showing the portion of the door adjacent the handle edge thereof;

Fig. 3 is a sectional view through the gasket near the top of the door as indicated by the line III—III in Fig. 1, but showing the door in its closed position;

Fig. 4 is a sectional view through the gasket near the bottom of the door as indicated by the line IV—IV, but showing the door in closed position;

Fig. 5 is a vertical sectional view taken on line V—V of Fig. 1, illustrating the action of the gasket as the door is being opened.

In Fig. 1, there is shown a refrigerator cabinet 10 having doors 11 mounted thereon by hinges 12. A handle 13 is secured to the outer face of each door 11 near the edge opposite the hinges 12 in a conventional manner. A magnetic gasket 14 is attached to the margin of each inner door face and adapted to engage a magnetically attractable seat 16 on the front wall of the cabinet 10 to effect a seal between the door 11 and the cabinet. It is to be understood, however, that the invention will not be departed from if the gasket is secured to the cabinet and adapted to engage a door-mounted seat.

For the sake of brevity, the invention will be described with reference to that vertical segment of the gasket disposed adjacent the handle edge of the door, and which employs the novel clamping arrangement of this invention (see Figs. 2 and 3). A uniformly extruded gasket 14 of resilient material is provided with a tubular body portion 17 for accommodating a plurality of permanent magnets 18. The magnets 18 are inserted into the elongated hollow chamber of the body portion 17 in order to render that portion of the gasket 14 magnetic. The body portion 17 has a flat, longitudinally extending member of uniform rectangular cross section extending transversely therefrom. For the purpose of clearness, this member will be treated as a composite having clamped and unclamped portions, each being functionally distinct. The unclamped portion is a longitudinally extending web portion 19 which integrally protrudes from the body portion 17. Formed integrally with the web portion 19 is a longitudinally extending flange or clamped portion 21, of the same thickness as the web portion, and by which the gasket 14 is secured to the door 11. The web and flange portions 19 and 21 taper longitudinally, but in opposite directions, so that, together with the body portion 17, they comprise a co-extending, unitary gasket segment of uniform cross section.

In order to clamp the gasket 14 to the cabinet door 11, inner and outer clamping strips, indicated at 22 and 23, respectively, are provided. Preferably, the clamping strips 22 and 23 are made of non-magnetic material, such as plastic, and are suitably secured to the door 11 by non-magnetic screws or the like, so that the magnetic attraction of the seat 16 will not be opposed. The longitudinally extending flange portion 21 is sandwiched between the inner clamping strip 22 and the door 11 for fixed attachment to the door. The unclamped, longitudinally extending web portion 19 of the gasket 14 serves as a flexible connecting web between the clamped flange section 21 and the body portion 17. The outer clamping strip 23 is laterally spaced from and generally parallel to the inner clamping strip 22 for clamping a thickness of the gasket flange 21 between complementary inclined edges of the clamping strips. This arrangement is used in order to hold the web portion 19 obliquely with respect to the plane of the door 11, so that the body portion 17 extends outwardly for contact with the seat 16 when the door is closed.

Now referring to Figs. 2, 3 and 4, the gasket 14 and the clamping strips 22 and 23 will be described in greater detail. The inner clamping strip 22 is tapered and has its narrow end near the top of the door 11 and its wide end near the bottom of the door. (Compare Figs. 3 and 4.) Accordingly, a greater portion of the gasket flange 21 is clamped near the bottom of the door than at the top and, therefore, the unclamped web portion 19 of the gasket 14 tapers convergingly toward the bottom of the door. Both clamping strips 22 and 23 are tapered at the same uniform rate, but in opposite longitudinal directions. The outer edge of the outer clamping strip 23 is parallel to the hinge axis and the inner edge is in parallel spaced relationship with the outer edge of the inner clamping strip 22; these opposing edges defining a tight passage for the gasket which is oblique with respect to both the hinge axis and the plane of the door 11. Therefore, the unclamped gasket portion 19 serves as a tapered connecting web between the clamped portion 21 and the body portion 17, and both the body portion and the unclamped portion 19 are free to move angularly about an axis which is oblique with respect to the hinge axis of the door.

When the cabinet door 11 is closed, the magnetic gasket 14 is attracted to the seat 16 and held in sealing relation therewith, all of which is well known. When the door 11 is being opened, the body portion 17 of the gasket 14 remains attached to the seat 16 until the slack in the web portion 19 is taken up and the opening force operates to overcome magnetic forces. Because the web portion 19 is tapered, the lower end of the body portion 17 is more closely coupled to the door 11 than its upper end and the slack is taken up first where the web portion 19 is narrowest, i. e., near the lower corner of the door at the handle edge. Fig. 5 illustrates the action of the gasket as the door is opened. In Fig. 5 the door 11 has been moved away from the cabinet 10 a distance greater than the width of the gasket web portion 19 in its narrowest region and, consequently, a short length of the gasket body portion 17 has been separated from its seal 16. As the opening movement of the door 11 proceeds, the remaining length of the gasket body 17 is peeled free of the seat 16.

It will be noted that the oblique disposition of the web portion 19, with respect to the plane of the door 11, encourages a bending action of the wider regions of this portion 19 of the gasket as the door approaches the cabinet 10 and as the gasket body portions 17 attached by narrower web portions 19 contact seat 16. While this invention can be practiced with a magnetic gasket in which the web portion 19 is normal to the plane of the door or is otherwise constructed so that it buckles, rather than bends, when the door is closed, the oblique arrangement of the web portion 19 is preferred because it renders the wider portions of the portion 19 easily deflected as the narrower gasket sections contact the seat 16.

The tapered configuration of the clamping strips 22 and 23 permits the bending action of the web portion 19 to take place about an axis which is oblique with respect to the edge of the door, and the gasket body 17 is, therefore, disposed parallel to the edge of the door to give the structure a more pleasing appearance. It should be pointed out, however, that the vertical clamping strips 22 and 23 can be of non-tapered construction and the same results can be achieved by clamping the flange portion 21 of the gasket in a manner to leave free a tapered web portion 19. If the latter arrangement were used, however, the gasket body 17 would extend obliquely with respect to the edge of the door 11 and, consequently, a less pleasing overall appearance would be presented.

While in the preferred embodiment of the invention the narrowest portion of the web portion 19 is at the bottom of the door 11, in such a manner that the peeling action of the gasket body 17 begins at the lower end of the gasket segment 22, the narrowest region of web portion 19 may be disposed near the top of the door 11, in a manner to reverse the direction of the peeling action of the gasket body 17.

The gasket mounting arrangement has thus far been described with reference only to the vertical segment near the handle edge of the door. Other gasket segments may be of similar gasket construction, clamped in similar fashion. However, clamping strips of uniform cross section may be employed for these other segments if desired.

From the foregoing it will be apparent this invention provides an improved magnetic gasket structure and a unique mounting arrangement therefor which enables the gasket to be easily separated from its seat by the application of light forces.

While the invention has been shown in but one form, it will be obvious to those skilled in the art that it is not so limited, but is susceptible of various changes and modifications without departing from the spirit thereof.

What is claimed is:

1. The combination comprising a gasket adapted to effect a seal between a door member and a cabinet member along a line extending around an opening closable by said door member, a magnetically attractable seat on one of said members, said gasket comprising a plurality of continuous, longitudinally extending segments, each of said gasket segments having a first longitudinally extending portion mounted on the other of said members, a second longitudinally extending portion having an elongated chamber therein, and a third longitudinally extending portion having one edge connected to said first portion and another edge connected to said second portion, a plurality of magnet structures arranged within said second portion for attraction by the seat to hold said gasket in sealing relation with said seat, said third portion of at least one segment of said gasket being of a width which tapers uniformly along its length, whereby one end of said one segment is coupled more closely to the member on which said gasket is mounted than the other end of said one segment, the arrangement being such that upon opening said door member the sealing relationship between said gasket and said seat is first discontinued at said one end of said one gasket segment.

2. A closure seal for a cabinet member having an access opening and a closure member movable with respect to said cabinet member for closing the opening therein; said closure seal comprising a magnetically attractable seat on one of said members; a gasket mounted on the other of said members, said gasket having an elongated body portion, means rendering said body portion magnetically attractable to said seat, and a longitudinally extending web attached to said body portion; and means securing said web to said other member, said securing means engaging said web at varying distances from the line of attachment between said web and the gasket body whereby at least one longitudinal portion of the gasket body is more closely coupled to the member on which said gasket is mounted than are other longitudinal portions of the gasket; the construction and arrangement being such that when said closure member is moved away from said cabinet member said one longitudinal portion of the gasket is separated from said seat before the other longitudinal portions thereof are separated from the seat.

3. A closure seal for a cabinet member having an access opening and a closure member movable with respect to said cabinet member for closing said opening; said closure seal comprising a magnetically attractable seat on one of said members; a gasket mounted on the other of said members adapted to engage said seat in sealing relationship along a line peripheral to said opening, said gasket having an elongated body, means rendering said body magnetically attractable to said seat; and means including a web extending transversely from said body along the length of the body for mounting said gasket on said other member, said web having a uniformly tapering width so as to more closely couple one longitudinal portion of said body to said other member than another longitudinal portion of said body, whereby said gasket body is progressively separated from said seat when said closure member is moved away from said cabinet member, the separation commencing with the closely coupled portion of the gasket body.

4. A closure seal for a cabinet member having an access opening and a closure member movable with respect to said cabinet member for closing said opening; said closure seal comprising a magnetically attractable seat on one of said members; a gasket mounted on the other of said members adapted to engage said seat in sealing relationship along a line peripheral to said opening, said gasket having an elongated body, means rendering said body magnetically attractable to said seat; and means including a web extending transversely from said body along the length of the body for mounting said gasket on said other member, said web being of non-uniform width so as to couple at least one longitudinal portion of said body more closely to said other member than other longitudinal portions of said body, whereby said gasket body is progressively separated from said seat when said closure member is moved away from said cabinet member, the separation commencing with the closely coupled portion of the gasket body.

References Cited in the file of this patent

UNITED STATES PATENTS 2,659,114     Anderson et al.           Nov. 17, 1953

FOREIGN PATENTS 686,047     Great Britain             Jan. 14, 1953